United States Patent Office 2,842,567
Patented July 8, 1958

2,842,567

THERAPEUTICALLY VALUABLE ESTERS OF ALCOHOLS AND KETOALCOHOLS OF THE STEROID SERIES AND PROCESS OF PREPARING SAME

Erich Haack, Heidelberg, Georg Stoeck, Mannheim-Waldhof, and Hans Voigt, Mannheim-Sandhofen, Germany, assignors to C. F. Boehringer & Soehne G. m. b. H., Mannheim, Germany No Drawing. Application May 5, 1954
Serial No. 427,866

Claims priority, application Germany May 9, 1953

10 Claims. (Cl. 260—397.4)

The present invention relates to new esters of steroid alcohols, and more particularly to new esters of steroid alcohols with β-keto carboxylic acids, and to a process of making same.

It is one object of the present invention to provide a new group of esters of alcohols and keto alcohols of the steroid series which are favorably distinguished over heretofore produced esters by a number of advantages. Said new esters, on account of their physical properties, permit parenteral administration of large deposits of such steroid hormones without requiring any solvent. Many of said esters are of surprisingly high activity.

Another object of the present invention is to provide a simple and effective process of making such new esters of alcohols and keto alcohols of the steroid series.

Other objects of this invention and advantageous features thereof will become apparent as the description proceeds.

The new esters according to the present invention are esters of β-keto carboxylic acids with alcohols and keto alcohols of the steroid series. Such alcohols and keto alcohols are, for instance, testosterone; 17α-methyl-$\Delta_{5,6}$-androstene-3β,17β-diol; androstane-3α,17β-diol; androstane-17β-ol-3-one; desoxycorticosterone; 17-hydroxy corticosterone; corticosterone; 11 - dehydrocorticosterone (Kendall's compound A); 11-hydroxy desoxycorticosterone (Reichstein's compound S); 17-hydroxy corticosterone (hydrocortisone); 17-hydroxy-11-dehydrocorticosterone (cortisone); estradiol; ethinyl estradiol; estriol; and the like.

The new esters are oily compounds, their oily state apparently being due to keto-enol tautomerism. They are well compatible with the human and animal body not only when administered as such but also when injected in the form of solutions in organic solvents as they are conventionally used in hormone therapy such as fatty oils, for instance, sesame oil, olive oil, and the like and also in β-keto carboxylic acids. Said esters are miscible with said solvents in any proportion. They may also be administered in the form of aqueous suspensions. They exhibit their remarkable properties not only when injected as such in the liquid state but also in such solution or suspension.

The preferred method of producing said new esters, however, consists in heating the steroid alcohol or keto alcohol with an ester of the β-keto carboxylic acid with a lower molecular alcohol, for instance, with its methyl or ethyl ester until said lower molecular alcohol liberated by said exchange esterification is completely distilled off.

It was found that not only aliphatic β-keto carboxylic acids but also acids of said type which are substituted by cycloaliphatic, aromatic, and heterocyclic residues, yield such oily esters of steroid alcohols. It is, of course, understood that for the production of esters to be used in therapy only such acids are to be used which, as such, do not have any disturbing physiological effect upon the human or animal body and which are substantially nontoxic. The preferred acids of this type are γ-alkyl aceto acetic acids of the following formula $$X.CH_2.CO.CH_2.COOH$$

wherein X is a saturated or unsaturated straight chain or branched alkyl group with 2 to 18 carbon atoms. Such acids are, for instance, butyryl, valeroyl, caproyl, oenanthoyl, capryloyl, pelargonoyl, caprinoyl, undecyoyl, lauroyl, myristoyl, palmitoyl, stearoyl, arachidoyl acetic acids, or the unsaturated aceto acetic acids, such as vinyl aceto acetic acid, undecylenoyl acetic acid, oleyl acetic acid and the like.

β-keto carboxylic acids having an aliphatic side chain in α-position, such as α-alkyl aceto acetic acids of the following formula $$CH_3.CO.CH(Y).COOH$$

wherein Y is a saturated or unsaturated straight chain or branched alkyl group with 2 to 18 carbon atoms are also suitable for ester formation. Such acids are, for instance, α-ethyl, vinyl, propyl, butyl, amyl, hexyl, heptyl, octyl, decyl, decenyl, dodecyl, tetradecyl, hexadecyl, octadecyl aceto acetic acids.

In place of the alkyl groups in γ- or α-position of the above mentioned aceto acetic acids, there may be present cyclopentyl, cyclohexyl, cyclopentenyl, cyclohexenyl, and other cycloaliphatic radicals or phenyl, tolyl, or other aromatic radicals, or heterocyclic radicals, such as pyridyl, piperidyl, morpholinyl, furyl, pyrryl, pyrrolidyl, and the like radicals. Acids of this type are, for instance, cyclopentyl aceto acetic acid, β-cyclopentyl propionyl acetic acid, phenyl aceto acetic acid, p-tolyl aceto acetic acid, β-phenyl propionyl acetic acid, furyl aceto acetic acid, and the like acids.

β-keto carboxylic acids of the following fromula $$Z.CO.CH_2.COOH$$

wherein Z is a cycloaliphatic, aromatic, or heterocyclic radical, and their reactive derivatives may also be employed for the esterification of steroid alcohols or keto alcohols according to the present invention. Especially suitable acids of this type are hexahydrobenzoyl acetic acid, benzoyl acetic acid, salicyl acetic acid, furoyl acetic acid, pyrroyl acetic acid and others.

The following examples serve to illustrate the present invention without, however, limiting the same thereto.

Example 1

A mixture of 1 g. of dry testosterone and 50 cc. of caprinoyl acetic acid ethyl ester are heated in a vacuum in an oil bath of 100° C. Testosterone is completely dissolved within about 30 minutes in the course of the ester interchange reaction. Esterification is completed after about 3 hours. Excess caprinoyl acetic acid ester is distilled off in a high vacuum at about $10^{-3}$ mm. Hg. 1.75 g. of a faintly yellowish oil are obtained as residue. Said ester can directly be used, without further purification, for therapeutical purposes.

To purify the crude ester, it is dissolved in ether and the solution is washed first with a large quantity of water and thereafter with 5% ethanol. The ethereal solution is treated with decolorizing carbon, filtered, the filtrate is dried over anhydrous sodium sulfate, and the ether is removed by distillation. 1.55 g. of oily testosterone caprinoyl acetate are obtained.

Analysis.—Calculated for $C_{31}H_{48}O_4$: 76.81% C; 9.98% H. Found: 76.60% C; 9.97% H.

In an analogous manner as described in the preceding example and following the steps thereof, there are obtained the following esters by using in place of testosterone, equimolecular amounts of other steroid alcohols or keto alcohols and equimolecular amounts of other β-keto carboxylic acid methyl or ethyl esters:

*Example 2*

Testosterone and oenanthoyl acetic acid ethyl ester yield testosterone oenanthoyl acetate.

Calculated for $C_{28}H_{42}O_4$: 75.97% C; 9.56% H. Found: 76.01% C; 9.50% H.

*Example 3*

Testosterone and hexahydrobenzoyl acetic acid ethyl ester yield testosterone hexahydrobenzoyl acetate.

Calculated for $C_{28}H_{40}O_4$: 76.32% C; 9.15% H. Found: 76.62% C; 9.09% H.

*Example 4*

Testosterone and α-n-hexyl aceto acetic acid ethyl ester yield testosterone α-n-hexyl aceto acetate.

Calculated for $C_{29}H_{44}O_4$: 76.27% C; 9.71% H. Found: 76.32% C; 9.69% H.

*Example 5*

Testosterone and α-n-dodecyl aceto acetic acid ethyl ester yield testosterone α-n-dodecyl aceto acetate.

Calculated for $C_{25}H_{56}O_4$: 77.72% C; 10.44% H. Found: 77.41% C; 10.50% H.

*Example 6*

Testosterone and lauroyl acetic acid ethyl ester yield testosterone lauroyl acetate.

Calculated for $C_{33}H_{52}O_4$: 77.29% C; 10.22% H. Found: 77.06% C; 10.18% H.

*Example 7*

Testosterone and palmitoyl acetic acid methyl ester yield testosterone palmitoyl acetate.

Calculated for $C_{37}H_{60}O_4$: 78.11% C; 10.63% H. Found: 77.88% C; 10.51% H.

*Example 8*

Testosterone and pelargonoyl acetic acid methyl ester yield testosterone pelargonoyl acetate.

Calculated for $C_{30}H_{46}O_4$: 76.55% C; 9.85% H. Found: 76.40% C; 9.92% H.

*Example 9*

Testosterone and undecylenoyl acetic acid methyl ester yield testosterone undecylenoyl acetate.

Calculated for $C_{32}H_{48}O_4$: 77.38% C; 9.74% H. Found: 77.15% C; 9.62% H.

*Example 10*

17α-methyl-$\Delta_{5,6}$-androstenediol-(3β,17β) and twice the equimolecular amount of oenanthoyl acetic acid ethyl ester yield 17α-methyl-$\Delta_{5,6}$-androstenediol-(3β,17β) di-oenanthoyl acetate.

Calculated for $C_{38}H_{60}O_6$: 74.47% C; 9.87% H. Found: 74.78% C; 9.99% H.

*Example 11*

Desoxycorticosterone and oenanthoyl acetic acid ethyl ester yield desoxycorticosterone oenanthoyl acetate.

Calculated for $C_{30}H_{44}O_5$: 74.34% C; 9.15% H. Found: 75.57% C; 9.03% H.

*Example 12*

Estradiol and butyryl acetic acid methyl ester yield estradiol-17-butyryl acetate.

Calculated for $C_{28}H_{42}O_4$: 75.97% C; 9.56% H. Found: 75.75% C; 9.30% H.

Of course, many changes and modifications in the steroid alcohols and keto alcohols and the esterifying β-keto carboxylic acid compounds used as reaction components, in the esterifying conditions, temperature, and duration, in the methods of working up and of purifying the resulting esters, and the like, may be made by those skilled in the art in accordance with the principles set forth herein and in the claims annexed hereto.

We claim:

1. The oily testosterone caprinoyl acetate of the formula

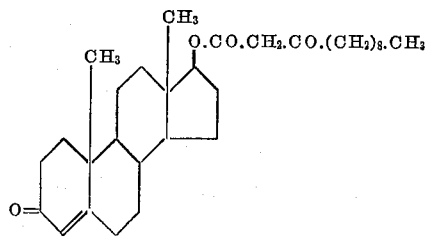

2. An oily ester of a steroid alcohol selected from the group consisting of steroid alcohols having sex hormone activity and steroid alcohols having adrenocortical hormone activity, with a β-keto carboxylic acid of the formula $$X—CO—CH_2—COOH$$

wherein X is a member selected from the group consisting of an aliphatic and a cycloaliphatic hydrocarbon radical having between 3 and 15 carbon atoms.

3. An oily 17-ester of a steroid alcohol selected from the group consisting of steroid alcohols having sex hormone activity and steroid alcohols having adrenocortical hormone activity, with a β-keto carboxylic acid of the formula $$X—CO—CH_2—COOH$$

wherein X is a member selected from the group consisting of an aliphatic and a cycloaliphatic hydrocarbon radical having between 3 and 15 carbon atoms.

4. An oily testosterone ester with a β-keto carboxylic acid of the formula $$X—CO—CH_2—COOH$$

wherein X is a member selected from the group consisting of an aliphatic and a cycloaliphatic hydrocarbon radical having between 3 and 15 carbon atoms.

5. An oily ester of a steroid alcohol selected from the group consisting of steroid alcohols having sex hormone activity and steroid alcohols having adrenocortical hormone activity with a β-keto carboxylic acid of the formula $$X—CO—CH_2—COOH$$

wherein X is a member selected from the group consisting of an aliphatic and a cycloaliphatic hydrocarbon radical having between 3 and 15 carbon atoms, said ester being directly injectable in its oily state into the patient and forming, on injection, a hormone depot of prolonged activity, said ester being readily miscible with fatty oils.

6. In a process of producing an oily ester of a steroid alcohol selected from the group consisting of steroid alcohols having sex hormone activity and steroid alcohols having adrenocortical hormone activity with a β-keto carboxylic acid of the formula $$X—CO—CH_2—COOH$$

wherein X is a member selected from the group consisting of an aliphatic and a cycloaliphatic hydrocarbon radical having between 3 and 15 carbon atoms, the steps comprising heating in a vacuum a mixture of a dry steroid alcohol having hormone activity with an excess of a lower alkyl ester of said β-keto carboxylic acid until the steroid alcohol is dissolved in said ester and the lower alkly group of said ester is exchanged by said steroid alcohol group, continuing heating the reaction mixture until the lower alcohol split off during esterification reaction is distilled off, and removing the excess of said β-keto carboxylic acid lower alkyl ester.

7. The oily testosterone oenanthoyl acetate of the formula

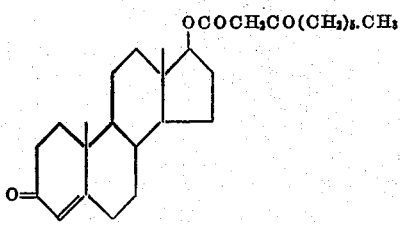

8. The oily testosterone-α-n-hexyl aceto acetate of the formula

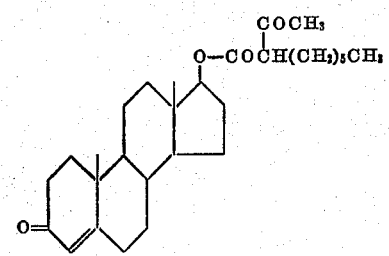

9. The oily estradiol-17-butyryl acetate of the formula

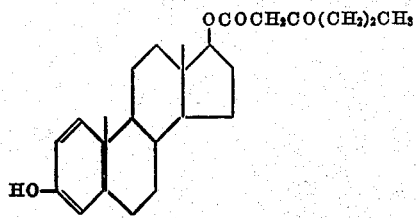

10. The oily desoxycorticosterone oenanthoyl acetate of the formula

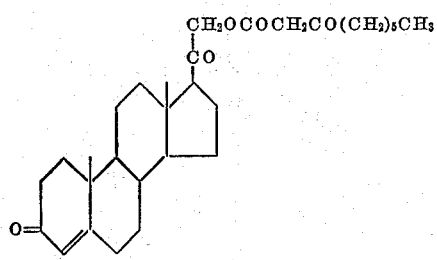

References Cited in the file of this patent

UNITED STATES PATENTS

| | | |
|---|---|---|
| 2,109,400 | Miescher | Feb. 22, 1938 |
| 2,143,453 | Ruzicka | Jan. 10, 1939 |
| 2,160,555 | Miescher | May 30, 1939 |
| 2,173,337 | Miescher | Sept. 19, 1939 |
| 2,205,627 | Miescher | June 25, 1940 |
| 2,265,183 | Miescher | Dec. 9, 1941 |
| 2,295,980 | Weisz | Sept. 15, 1942 |
| 2,693,476 | Cummings | Nov. 2, 1954 |

OTHER REFERENCES

Fieser et al.: Natural Products Related to Phenanthrene, 3d ed., pp. 424–426 (1949).